United States Patent
Nguyen et al.

(10) Patent No.: US 7,389,089 B1
(45) Date of Patent: Jun. 17, 2008

(54) METHODS TO REMOTELY CONTROL A WIRELESS UNIT

(75) Inventors: Hong Nguyen, Atlanta, GA (US); James C. Bedingfield, Sr., Lilburn, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 932 days.

(21) Appl. No.: 10/303,416

(22) Filed: Nov. 25, 2002

(51) Int. Cl.
H04B 1/16 (2006.01)
H04Q 7/00 (2006.01)
H04Q 5/22 (2006.01)

(52) U.S. Cl. ............... 455/73; 455/127.5; 455/343.2; 455/574; 340/7.33; 340/10.34

(58) Field of Classification Search ............... 455/70, 455/243.1, 343.1–343.4, 352, 574, 127.5, 455/418–420, 92; 340/10.33, 10.34, 7.32–7.36
See application file for complete search history.

(56) References Cited

U.S. PATENT DOCUMENTS

| | | | | |
|---|---|---|---|---|
| 5,537,460 | A * | 7/1996 | Holliday et al. | 455/435.1 |
| 5,541,976 | A * | 7/1996 | Ghisler | 455/426.1 |
| 5,608,655 | A * | 3/1997 | Moughanni et al. | 340/7.1 |
| 5,752,202 | A * | 5/1998 | Obright | 455/574 |
| 5,808,551 | A * | 9/1998 | Yarnall et al. | 340/573.4 |
| 5,881,101 | A * | 3/1999 | Furman et al. | 375/217 |
| 5,925,942 | A * | 7/1999 | Theobald | 307/125 |
| 5,940,771 | A * | 8/1999 | Gollnick et al. | 455/517 |
| 5,963,264 | A | 10/1999 | Jackson | |
| 6,100,814 | A * | 8/2000 | Doyle | 340/825.69 |
| 6,169,905 | B1 * | 1/2001 | Fukuda | 455/462 |
| 6,239,690 | B1 * | 5/2001 | Burbidge et al. | 340/10.33 |
| 6,295,448 | B1 | 9/2001 | Hayes, Jr. et al. | |
| 6,301,484 | B1 * | 10/2001 | Rogers et al. | 455/466 |
| 6,393,297 | B1 | 5/2002 | Song | |
| 6,477,361 | B1 * | 11/2002 | LaGrotta et al. | 455/343.1 |
| 6,480,476 | B1 * | 11/2002 | Willars | 370/311 |
| 6,564,074 | B2 * | 5/2003 | Romans | 455/574 |
| 6,618,580 | B2 * | 9/2003 | Parrott et al. | 713/310 |
| 6,662,023 | B1 | 12/2003 | Helle | |
| 6,725,053 | B2 * | 4/2004 | Rosen et al. | 455/518 |
| 6,760,578 | B2 * | 7/2004 | Rotzoll | 455/343.2 |
| 6,842,613 | B2 | 1/2005 | Mittal | |
| 6,909,891 | B2 | 6/2005 | Yamashita et al. | |
| 7,082,129 | B2 | 7/2006 | Cromer et al. | |
| 7,099,699 | B2 * | 8/2006 | Jeong | 455/565 |
| 7,103,344 | B2 * | 9/2006 | Menard | 455/343.2 |

(Continued)

Primary Examiner—Simon D Nguyen
(74) Attorney, Agent, or Firm—Cantor Colburn LLP (57) ABSTRACT

Methods for remote control of a wireless unit such as remote power-on and remote power-off. An authorized user may send a power-on communication to a remote wireless unit. The power-on communication may be sent by way of an activation system. The wireless unit may be in a sleep state or be turned-off. In response to receipt of the power-on communication or a signal from the activation system, the wireless unit powers-on and may power-on through a remote power-on function. The power-on communication or the signal that initiates the power-on may include a security mechanism necessary to power-on the wireless unit. The user may be provided with confirmation of the power-on of the wireless unit, or the user may be connected in a communication with the wireless unit. Similarly, a wireless unit that is powered-on may be remotely powered-off.

20 Claims, 6 Drawing Sheets

U.S. PATENT DOCUMENTS

2002/0030603 A1* 3/2002 Amano et al. .......... 340/825.69
2002/0068544 A1 6/2002 Barzilay et al.
2002/0177476 A1* 11/2002 Chou ......................... 455/574
2003/0139175 A1* 7/2003 Kim ........................... 455/419
2003/0198196 A1* 10/2003 Bahl et al. ................... 370/311
2004/0040317 A1* 3/2004 Slifkin et al. ................ 62/132
2004/0196142 A1* 10/2004 Berg .......................... 340/7.1
2004/0242267 A1* 12/2004 Walsh ...................... 455/556.1

* cited by examiner

METHODS TO REMOTELY CONTROL A WIRELESS UNIT

FIELD OF THE INVENTIONS

The inventions relate to communications, and particularly relate to wireless units that are used in communications. Even more particularly, the inventions relate to remote control of the wireless units such as by remote powering-on of a wireless unit that is turned-off or by remote powering-off of a wireless unit that is powered-on.

BACKGROUND

Communication devices are ubiquitous in our society. Besides a telephone at home and at work, many people also have other devices such as a mobile phone, a personal digital assistant (PDA), a pager, an i-pager, a laptop computer, or the like. Unlike a landline telephone, these other communication devices may travel with the user. In addition, these other devices may be turned-on and turned-off.

A user with a mobile device may turn-off the device for many reasons. The user may desire to conserve the battery of the device. Sometimes circumstances dictate that the mobile device be turned-off. Many people turn-off their mobile phones when they are driving to avoid the temptation of answering calls, and thus, using the mobile phones while driving. Other people turn-off their mobile devices while attending meetings, or while participating in public events or gatherings where use of the mobile devices would be perceived as impolite or inconsiderate with respect to others. Sometimes, a person may turn-off his or her mobile device simply to avoid being disturbed. In other cases, a person may inadvertently turn-off his or her device and may not realize it.

Once a person turns-off his or her mobile device, the person cuts himself or herself off from people who may desire to communicate with him or her through the mobile device. For example, when 1 turn off my mobile phone, people who try to reach me using my mobile number are unable to do so. At times, the inability to reach a person who has turned off his or her mobile device may simply be inconvenient. At other times, the unavailability of the person through the mobile device may be disadvantageous, unfortunate, or even devastating to either the user, the caller, or both.

It may be devastating to the caller to be unable to reach a person on his or her turned-off mobile device because the caller may be having an emergency. The caller may have suffered a car accident, incurred some injury, or be threatened in some way. In other words, the caller may be in need of help and unable to reach the person with the turned-off mobile device for such help.

The inability to contact the person who turned off his or her mobile device may be disadvantageous or even disastrous for that person, too. For example, a family member who is keeping up with weather conditions in the person's area may have information regarding the need to evacuate the area immediately such as in the case of a tornado or hurricane. But the family member may be frustrated in his or her attempts to convey information on the emergency situation to the person because his or her mobile device is turned-off. The family member may suffer anguish in not knowing whether the person is safe or even aware of the weather emergency. If the person remains unaware of the weather conditions, the person may be in a life threatening situation.

Thus, there is a need for methods to reach a person whose mobile device is turned-off. In particular, there is a need for methods to remotely power-on the mobile device so that a communication may be put through to the mobile device.

Similarly, there are circumstances where it would be convenient or important to be able to turn-off a remote mobile device that has been powered-on. For example, a person may have left his or her mobile device at home while traveling. There is little point for the mobile device to be powered-on when the user is remote from the device. It would be convenient for the person to be able to remotely turn-off the powered-on mobile device. As an another example, a person may have a powered-on mobile device and be in a situation where a call to the device would be embarrassing, disturbing, or even dangerous. If another party knew of the situation, it would be desirable for the other party to be able to turn-off the powered-on device in the person's possession.

In sum, there is a need for remote control over mobile devices. In particular, there is a need for methods to remotely power-on a mobile device so that a communication may be put through to the mobile device. There is also a need for methods to remotely turn-off a mobile device that is powered-on.

SUMMARY

Stated generally, the inventions provide methods to remotely control a wireless unit such as by powering-on a wireless unit that is turned-off or by turning-off a wireless unit that is powered-on. The inventions include several embodiments as summarized below.

An embodiment of the inventions provides a method to remotely power-on a wireless unit. An activation system in a telecommunications system receives a power-on communication such as a call from an authorized user, who desires a particular wireless unit to be turned-on. In response to the power-on communication, the activation system sends a signal to the wireless unit. Even if the wireless unit is "turned-off", it is able to receive the power-on signal. Even though the wireless unit is turned-off, certain functions of the wireless unit may be active. These functions may include a transmit and receive function, a location function and a remote power-on function. These functions may remain active even though the wireless unit is turned-off because they may be connected to a power source of the wireless unit so that the functions are unaffected by the conventional on/off function of the unit. In response to receipt of the signal from the activation system, the remote power-on function of the wireless unit powers-on the wireless unit.

After the wireless unit is powered-on, the remote power-on function of the wireless unit may deactivate. In addition, the activation system may verify that the wireless unit is turned-on by calling the wireless unit or sending it a message. The activation system may receive a confirmation response from the wireless unit. The activation system may provide a confirmation to the party trying to power-on the wireless unit. The activation system may provide the party with an opportunity to be connected to the wireless unit through a telephone call or other communication.

An embodiment of the inventions provides a method to configure a wireless unit that may be remotely powered-on. The wireless unit may be configured to have a power-on state and a sleep state. When a user turns-off the wireless unit, it goes into the sleep state. In the sleep state, the wireless unit does not accept communications such as incoming calls or messages from someone trying to contact the user of the wireless unit. Even though the wireless unit is sleeping, it has an active transmit and receive function and an active location function. If the wireless unit receives a remote power-on signal, then a remote power-on function of the wireless unit may change the wireless unit to the power-on state.

Another embodiment of the inventions also provides a method to configure a wireless unit that may be remotely powered-up. In this embodiment, the wireless unit includes a remote power-on function, which is able to detect receipt by the wireless unit of a remote power-on signal. In response to detecting the remote power-on signal, the remote power-on function powers-on the wireless unit. In some cases, as a security precaution, the remote power-on function may only power-on the wireless unit if the remote power-on signal includes a security mechanism.

The remote power-on function may power-on the wireless unit by activating an on/off button on the wireless unit. For example, the remote power-on function may power-on the wireless unit by mimicking activation of an on/off button or conventional on/off function of the wireless unit. The remote power-on function may be a page detector and the remote power-on signal may be a page. If the page detector detects a page, then the page detector causes the power-on of the wireless unit. The wireless unit may include a prevention function to prevent the activation of the on/off button on the wireless unit when the wireless unit is powered-on.

The inventions also include an embodiment that provides a method to remotely turn-off a wireless unit that is powered-on. An activation system may receive a turn-off communication from a user. In response to the turn-off communication, the activation system sends a signal to the wireless unit, which turns itself off in response to the signal. When the wireless unit turns-off, a remote power-on function of the wireless unit may be active. Thus, if the activation system receives a power-on communication, the activation system may send a power-on signal to the wireless unit, which may power-on in response to the power-on signal.

In sum, the inventions provide methods to remotely control a wireless unit such as by powering-on a wireless unit that is turned-off or by turning-off a wireless unit that is powered-on. Thus, the inventions satisfy the need for remote control over mobile devices.

The advantages of the inventions may be more clearly understood and appreciated from a review of the following detailed description and by reference to the appended drawings and claims.

DETAILED DESCRIPTION

Figure 1:
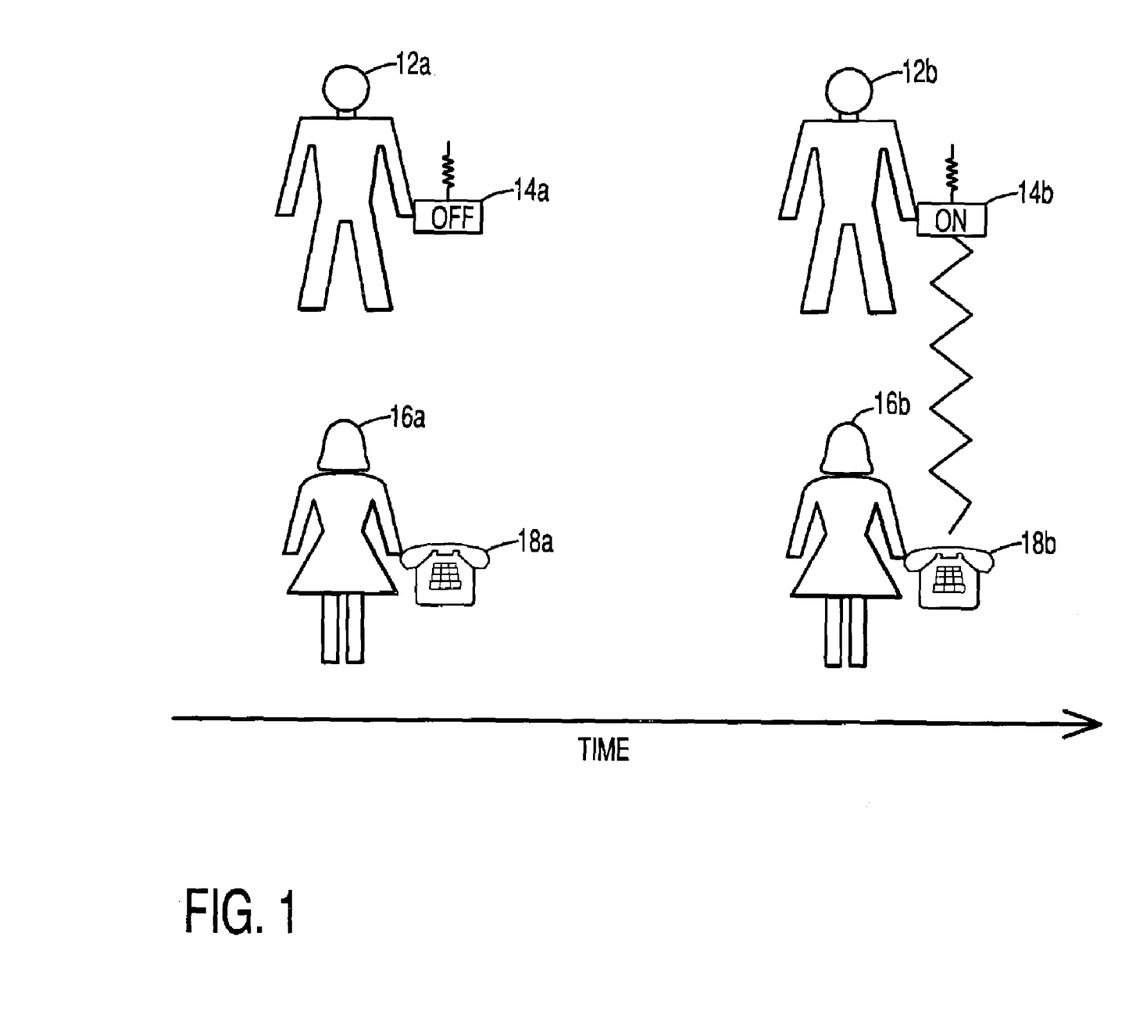
FIG. 1 illustrates an environment including use of an exemplary embodiment of the inventions.

The inventions allow for remote control of a wireless unit. In particular, the inventions may be used to remotely power-on a wireless unit that has been turned-off. For example, referring to FIG. 1, a user 12a of a wireless unit 14a has turned-off his wireless unit 14a. A caller 16a, desires to contact the user 12a on his wireless unit 14a, but is frustrated because the user's wireless unit 14a is turned off. Advantageously, the inventions allow the caller 16b to remotely power-on the turned-off wireless unit 14b. The caller 16b may use a telephone 18b to place a call to a preauthorized number. As a result of the call, the wireless unit 14b is turned-on. In addition, the caller 16b may be connected by the call on the telephone 18b to the user 12b of the wireless unit 14b. Thus, the caller 16b has achieved making contact with the user 12b through the user's wireless unit 14b.

DEFINITIONS

As used herein, the terms "powered-on" and "turned-on" (or variations thereof) are synonymous. Also, the terms "powered-off" and "turned-off" (or variations thereof) are synonymous.

The party, who takes action to remotely turn-on or turn-off the wireless unit, may be a person and may be referred to herein as the authorized user. The user is qualified herein as "authorized" because it is assumed that only selected parties would have sufficient information to power-on or power-off a wireless unit of another party. For example, a party attempting to power-on or turn-off a wireless unit may be required to provide a password. Nonetheless, no specific authorization to a user is necessary to the principal function of the inventions. Further, the authorized user does not have to be a person. The authorized user may be a computer, or other device with the functionality to take actions to remotely turn-on or turn-off the wireless unit per the inventions. The party associated with the wireless unit to be remotely turned-on may be a person, and may be referred to herein as the user.

In the examples, a mobile phone is used as the wireless unit that is remotely turned-on or turned-off. But a wireless unit is not limited to being a mobile phone, and may be any device with appropriate functionality to work with the inventions. For example, a wireless unit may be a computer, a personal digital assistant (PDA), a pager, an i-pager, or other similar device.

Also in the examples, a telephone is used as the communications device to remotely turn-off or turn-off the wireless unit. But a communications device may be any other device with the functionality to work with the inventions. For example, a communications device may be a computer, a personal digital assistant, a pager, an i-pager, a mobile phone, or other similar device.

An activation system is referenced with respect to some of the exemplary embodiments of the inventions. The activation system may be a computer running a program or application, or be a program or application. In either case, the activation system may have access to a database, a computer, a server, a platform, or other program or device to facilitate recognition of communication information received from an element of the public switched telephone network (PSTN), such as a service control point (SCP) or other communications element. In response to the recognition, the activation system takes action or has access to an element(s) that cause a signal to be sent to a wireless unit. The activation system is illustrated in an embodiment of the inventions as a separate unit connected between the PSTN and a wireless system. But the activation system need not be so limited. The activation system may be a part of or included in another device in either the PSTN 24, the wireless system 32, or an appropriately connected data communications network (not illustrated).

Figure 2:
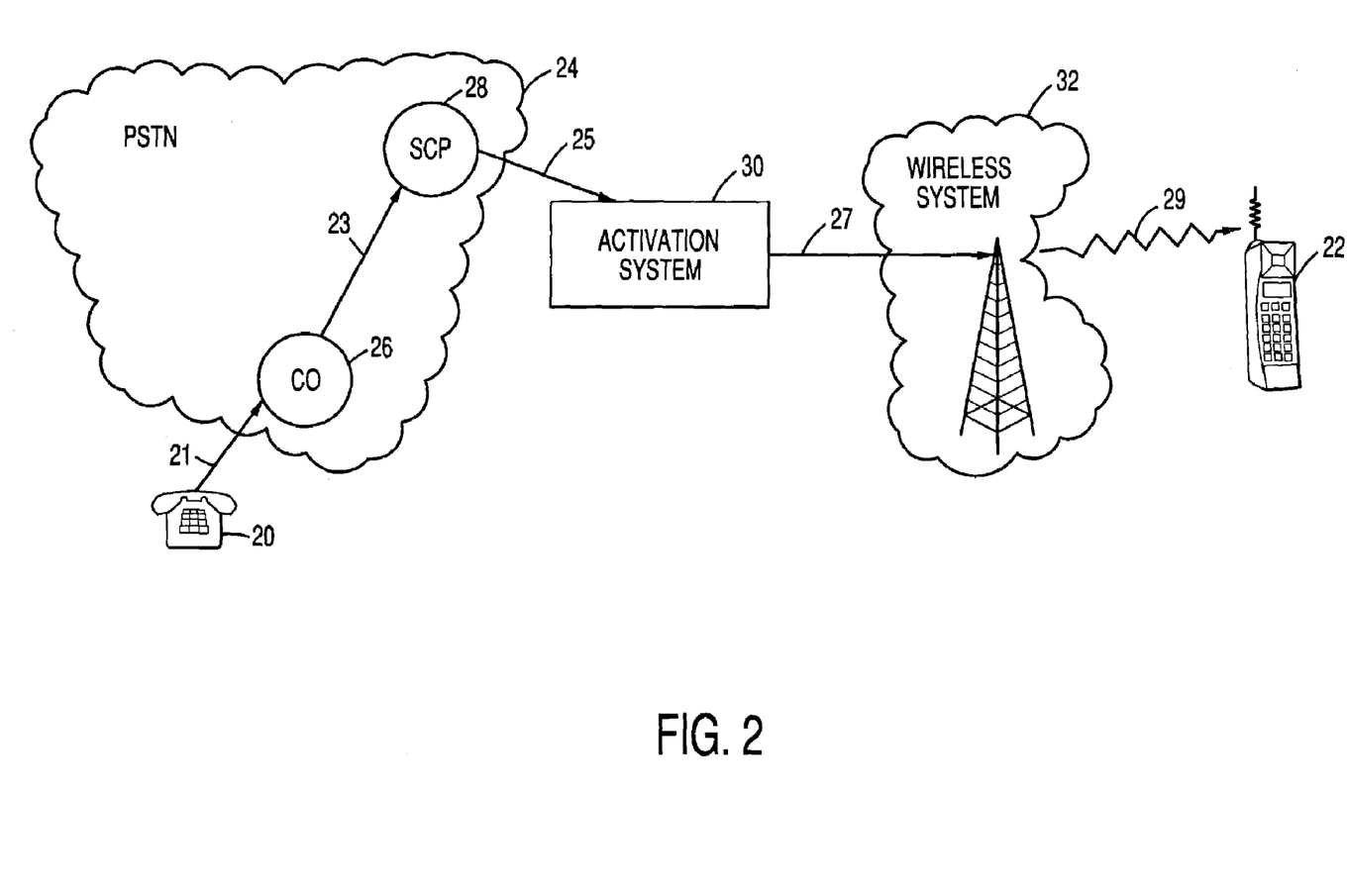
FIG. 2 illustrates another environment for use of an exemplary embodiment of the inventions.

Use of an Exemplary Embodiment—FIG. 2

FIG. 2 illustrates an environment for an embodiment of the inventions. In this exemplary embodiment, a party may remotely turn-on a wireless unit of another party. Specifically, an authorized user may use a communications device 20 to make a communication to begin a process to remotely turn-on a user's wireless unit 22 that is turned-off.

In the case of a telephone as the communications device 20, the authorized user may place a call to a special number such as an access number or a star code. As illustrated by arrow 21, the call is noted at the central office (CO) 26 of the public switched telephone network (PSTN) 24 serving the authorized user's device 20. The CO 26 also may be referred to as a service switching point (SSP), or an end office (EO). Based on the number dialed, the call by the authorized user may encounter a trigger at the CO 26. The trigger may be a Terminating Attempt Trigger (TAT), a Public Office Dialing Plan Feature Code trigger, or a Specific Digit String trigger. As indicated by arrow 23, the CO 26 may query a service control point (SCP) 28 for instructions on how to handle the call from the authorized user.

Based on the number dialed (or otherwise), the SCP 28 may identify the call from the authorized user as a call to turn-on the wireless unit 22. The call or its elements (such as data about the call) may be referred to as a power-on communication, i.e., a communication to power-on or turn-on a wireless unit. For example, the SCP 28 may recognize the call (whether it is a call to an access number, a star code, or otherwise) as a call to turn-on or power-on a wireless unit 22. In response to this recognition, as illustrated by arrow 25, the SCP 28 may contact an activation system 30 and provide the activation system 30 with the communication information associated with the call.

In an alternate embodiment, to remotely power-on a wireless unit, the authorized user may place a call to a directory number that results in the call being routed directly to the device including the remote control functionality such as the activation system 30.

In an exemplary embodiment, in response to the communication information received from the SCP 28, the activation system 30 may provide instructions or take other action, as indicated by arrow 27, through the wireless system 32, and as indicated by arrow 29, so that a signal reaches the wireless unit 22 that causes the wireless unit 22 to power-on. For example, the activation system 30 may provide information to the wireless system 32 including the telephone number of the wireless unit 22, the desired command (such as "power-on"), and an authorization code all received from the SCP 28. This information received from the activation system 30 may cause the wireless system 32 to send a signal to the wireless unit 22 that the wireless unit 22 interprets as an indication to power-on.

In the exemplary embodiment described above, the activation system 30 sends information to the wireless system 32 so that a signal reaches the wireless unit 22 that causes the wireless unit 22 to power-on. But in another embodiment, the activation system 30 does not send information to the wireless system 32. Rather, the activation system 30 responds with information to the SCP 28. Alternatively, the SCP 28 itself may contain the necessary activation information. The SCP 28 may use the information to instruct the CO 26 (or other device such as a service node) to contact the wireless system 32. The contact may cause a signal to be sent to the wireless unit 22 that causes the wireless unit 22 to turn-on. As an example, the SCP 28 may instruct the CO 26 to route the call from communications device 20 through the PSTN 28 to the wireless system 32. As another example, the SCP 28 may provide communication information and instruct a peripheral device (such as a service node) to call the wireless system 32. In response to receipt of the call, the wireless system 32 may send a signal to the wireless unit 22 that causes the wireless unit 22 to turn-on.

An advantage of this exemplary embodiment of the inventions is that an authorized user does not have to take separate action to determine that the power-on efforts were successful. This embodiment provides confirmation of the powered-on state of the wireless unit 22. For example, once the activation system 30 sends information to cause power-on of the wireless unit 22, the activation system 30 may take action to verify that the wireless unit 22 is powered-on. The activation system 30 may call the wireless unit 22, or may cause a call to be placed to the wireless unit 22 through the PSTN 24 or otherwise. Similarly, the activation system 30 may send a message to the wireless unit, or may cause a message to be sent to the wireless unit 22 through the PSTN 24, or otherwise.

In response to the call or to the message, the activation system 30 may receive a response from the wireless unit 22 or from the wireless system 32. If the activation system 30 receives a response confirming that the wireless unit 22 is powered-on ("confirmation response"), then the activation system 22 may provide a confirmation to the authorized user who initiated the power-on communication. The activation system 30 may contact the authorized user with the confirmation, or the activation system may cause the confirmation to be provided to the authorized user through the PSTN, or otherwise.

Further, the activation system 30 may connect the authorized user in a communication with the wireless unit 22. For example, the activation system 30 may provide instructions to route the authorized user's power-on communication so as to connect the power-on communication to the wireless unit 22.

It will be appreciated that the actions described above in connection with the powering-on of a wireless unit may also be used (with appropriate changes) to turn-off the wireless unit. An appropriate change may include a change in the access number or star code used by the authorized user to commence the actions. Alternatively, the authorized user may be asked to indicate whether the communication is to effect power-on or turn-on, and such indication may be associated with the communication information and signals to the wireless unit 22.

Figure 3:
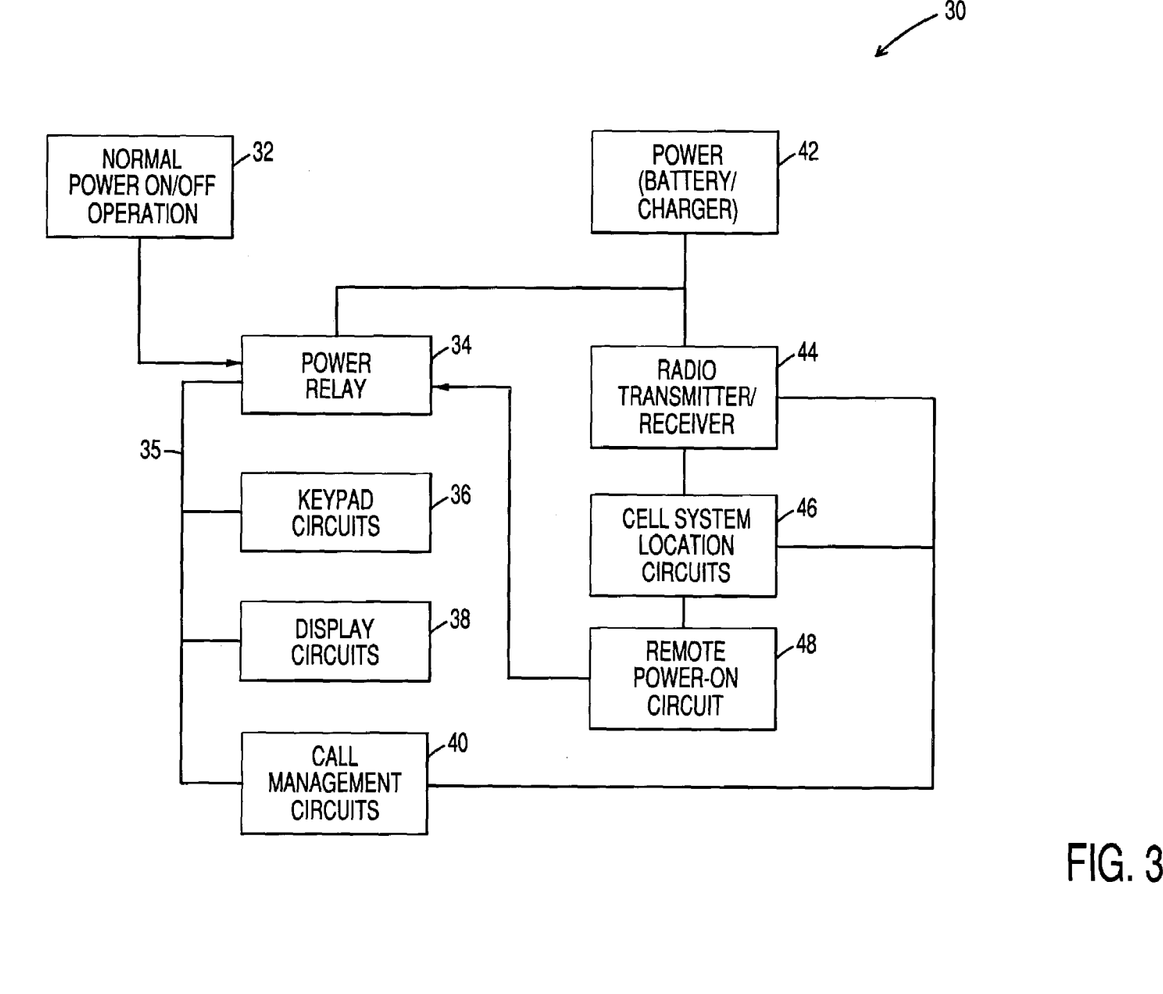
FIG. 3 is a block diagram illustrating certain functions of an exemplary wireless unit as may be used with an embodiment of the inventions.

Functions of an Exemplary Wireless Unit—FIG. 3

As noted in connection with FIG. 2, in response to the receipt of a signal, the wireless unit 22 changes state from turned-off to powered-on. In an exemplary embodiment, the wireless unit 22 includes a remote power-on function (also referred to herein as remote power-on circuit) 48. Even though the wireless unit 22 is turned-off, the wireless unit 22 may receive a power-on signal. The wireless unit 22 may receive a power-on signal because, even though the wireless unit 22 is turned-off, certain functions of the wireless unit 22 may remain active. In an exemplary embodiment of the wireless unit 22, the transmit and receive function (also referred to as the radio transmitter/receiver), the location function (also referred to as the cell system location circuits), and the remote power-on function of the wireless unit 22 may remain active. With these functions remaining active, the wireless system 32 may be able to keep track of the location of the wireless unit 22 and may be able to send the wireless unit a signal, which causes the wireless unit 22 to power-on.

FIG. 3 is a block diagram illustrating certain functions of an exemplary wireless unit 30 as may be used with an embodiment of the inventions. The functions may include a power on/off operation (also referred to as "normal", "conventional", or "standard" on/off function that may be activated by an on/off button). The functions of the wireless unit 30 also may include the on/off operations 32 connected to a power relay 34. The power relay 34 connects to a bus 35 that connects keypad circuits 36, display circuits 38, and call management circuits 40. Further, the functions of the wireless unit 30 may include power 42 (also referred to as the battery or battery/charger) connected to the power relay 34 and to the radio transmitter/receiver 44 (also referred to as the transmit and receive function). The radio transmitter/receiver 44 is connected to the cell system location circuits 46 (also referred to as the location function) and to the call management circuits 40. The cell system location circuits 46 are connected to the remote power-on circuit 48 (also referred to as the remote power-on function) and to the call management circuits 40. The remote power-on circuit 48 is connected to the power relay 34.

In the exemplary embodiment, the wireless unit 30 is initially in a turned-off state. When the wireless unit 30 is turned-off, certain functions remains active. These functions include the transmit and receive function 44, the location function 46, and the remote power-on function 48. These functions remain active because these functions are connected to the power 42 of the wireless unit 30. The transmit and receive function 44, the location function 46, and the remote power-on function 48 are not affected by the on/off function 32 of the wireless unit. In other words, when the wireless unit 30 is turned-off, the transmit and receive function 44, the location function 46, and the remote power-on function 48 remain active.

In particular, the turned-off wireless unit 22 may receive a signal from the wireless system 32 through its active transmit and receive function 44. The active location function 46 of the turned-off wireless unit 22 has kept the wireless system 32 apprised of the location of the wireless unit 22. Once the signal is received, the remote power-on function 48 "powers-on" the wireless unit 22 by a turn-on signal sent to the power relay 34. Thus, the remote power-on function 48 may function like an on/off switch or button. Advantageously, when the wireless unit 30 is powered-on, the remote power-on circuit 48 may be deactivated.

It will be appreciated that the configuration and functions of the wireless unit 22 described above in connection with the powering-on of a unit may also be used (with appropriate changes) to turn-off the wireless unit. Once the wireless unit 22 receives a signal that indicates the unit is to be turned-off, the remote power-on function 48 of the wireless unit 22 sends a "turn-off" signal to the power relay 34. Even though the wireless unit 22 is turned-off, its transmit and receive function 44, the location function 46, and the remote power-on function 48 may remain active.

Figure 4:
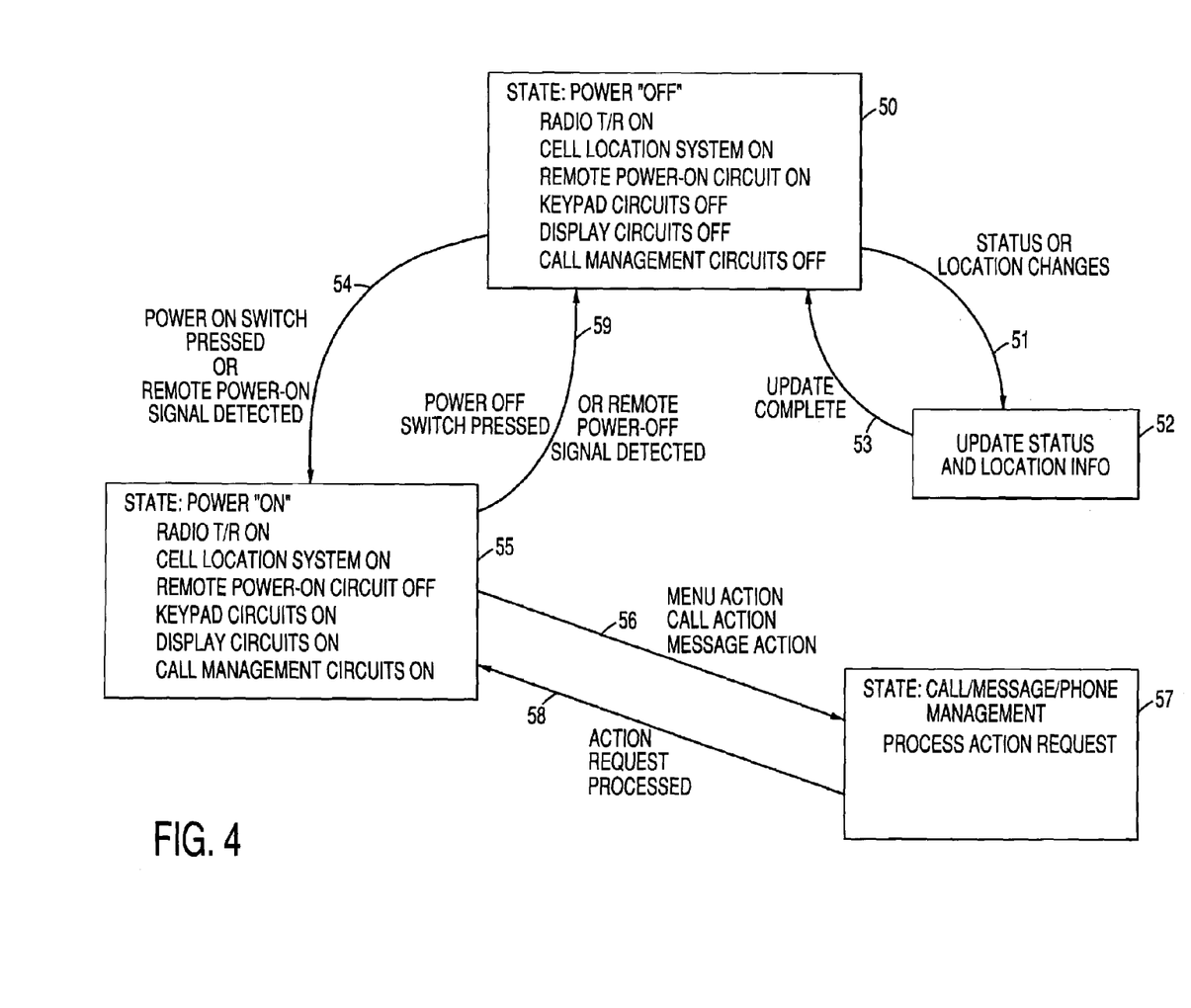
FIG. 4 is a state diagram illustrating exemplary states of a wireless unit as may be used with an embodiment of the inventions.

State Diagram Illustrating Exemplary States of a Wireless Unit—FIG. 4

FIG. 4 is a state diagram illustrating exemplary states of a wireless unit as may be used with an embodiment of the inventions. For example, assume the state of a wireless unit is "off" as referenced in block 50 by power "off". This "off" state also may be referred to as the "sleep" state of an exemplary embodiment of the inventions. In an exemplary embodiment, if the state of the wireless unit is off, then the radio TR (also referred to as the radio transmitter/receiver or the transmit and receive function 44) is turned-on. Also turned-on are the cell location system (also referred to as the location function 46) and the remote power-on circuit (also referred to as the remote power-on function 48). Still referring to block 50 with the wireless unit in the "off" or "sleep" state, the functions related to keypad circuits, display circuits, and call management circuits are turned-off.

While the wireless unit is in the off or sleep state, events may transpire with respect to the status or location of the wireless unit. As illustrated by arrow 51 in FIG. 4, if the status and/or the location of the wireless unit changes, then the state of the wireless unit changes from off or sleep to an update status as indicated by block 52. In the update status, the wireless unit is updated with status and/or location information. The wireless unit is able to function in this update status because certain of its functions (as explained above in connection with FIG. 3) remain active even though the unit is turned-off or sleeping. Once the update is complete, then as indicated by arrow 53 in FIG. 4, the state of the wireless unit returns to the "off" or "sleep" state.

While the wireless unit is in the off or sleep state, the wireless unit does not accept communications attempting to reach the user of the wireless unit. However, while the wireless unit is in the off or sleep state, a signal or other information may be received by the wireless unit to "power-on". For example, a wireless unit in the off or sleep state may receive a signal indicating that the power on/off switch has been pressed. The pressing of the power on/off switch is a conventional manner of turning on the wireless unit. Alternatively, the wireless unit in the off or sleep state may receive a signal or otherwise understand that the wireless unit is to power-on. For example, a remote power-on signal may be received and detected.

If a power-on signal (whether remote or conventional) is received by the wireless unit in the off or sleep state, then as indicated by arrow 54, the state of the wireless unit may change from off or sleep to "on" as referenced in block 55 by power "on". In the on state, the radio T/R and the cell location system of the wireless unit are turned-on. In addition, the keypad circuits, the display circuits, and the call management circuits are turned-on. But the remote power-on circuit may be turned off. In an alternate embodiment, the remote power-on circuit also may remain active when the wireless unit is in the on state.

While the wireless unit is powered-on, certain actions as indicated by arrow 56 may take place to change the state of the wireless unit to a call/message/phone management state as illustrated by block 57. For example, a menu action, a call action, or a message action may take place with respect to the wireless unit. Once the action is received, it is processed by the wireless unit, and as indicated by arrow 58, the wireless unit returns to the power on state as indicated by block 55.

While in the power on state as indicated by block 55, the wireless unit may receive a power-off signal. If a power-off signal (whether remote or conventional) is received by the wireless unit in the on state, then as indicated by arrow 59, the state of the wireless unit may change from on to off as referenced in block 50 by power "off". As noted above in connection with the power off state, the radio T/R and the cell location system of the wireless unit remain active while the other functions of the wireless unit may be turned off.

Figure 5:
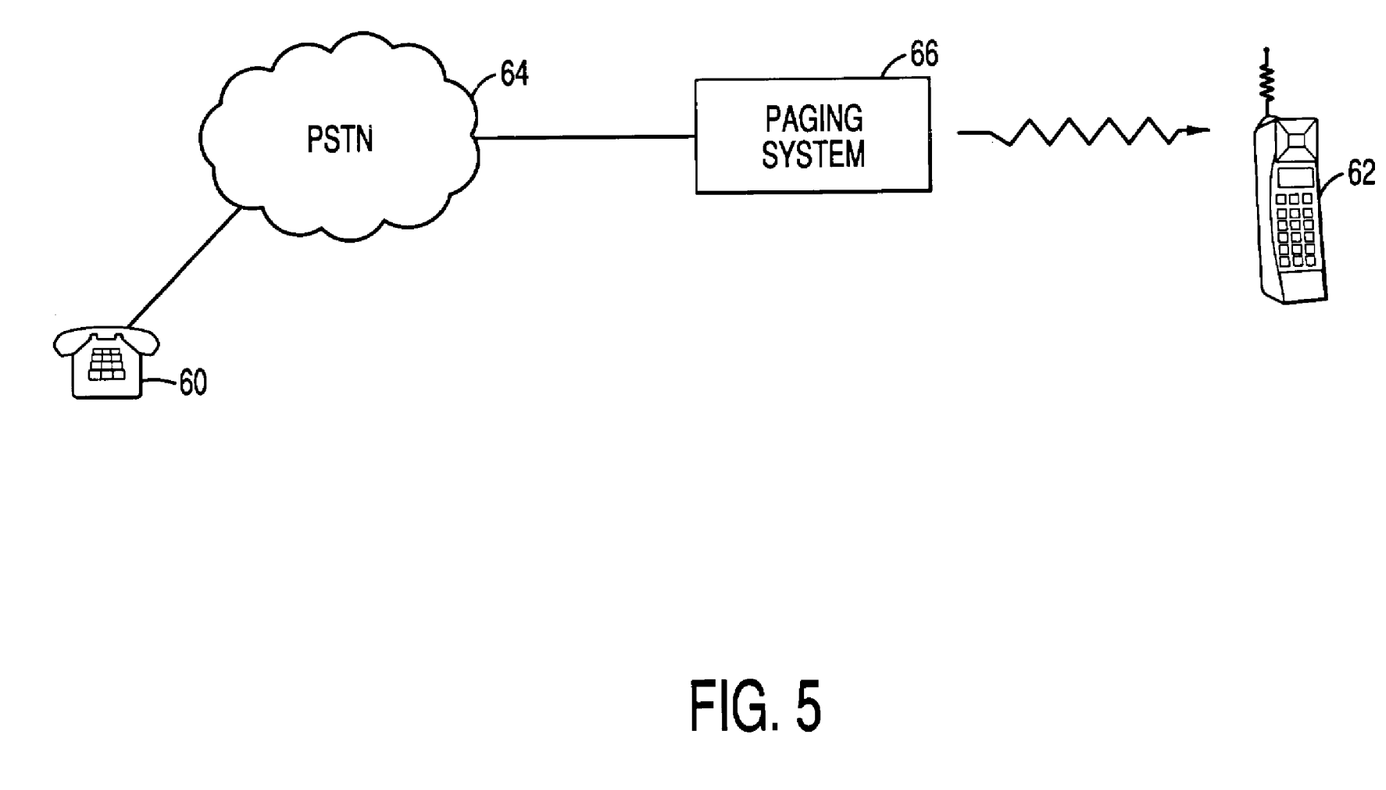
FIG. 5 illustrates yet another environment for use of an exemplary embodiment of the inventions.

Use of Another Exemplary Embodiment—FIG. 5

The inventions provide for yet another alternative exemplary embodiment to provide for the remote power-up or turn-off of a wireless unit. In this embodiment, the wireless unit may include a remote power-on function. If the remote power-on function detects receipt of a signal, then the remote power-on function may power-on the wireless unit (or turn-off the unit depending on the circumstances).

An example of this alternative embodiment is illustrated in FIG. 5. An authorized user 60 may initiate a communication or send a signal to power-on or turn-off a wireless unit 62. In an exemplary embodiment, the signal may be a page. Thus, the authorized user 60 may use a telephone (or any other appropriate device) to send a page that is received by the PSTN 64, and that is conveyed to a paging system 66. The page is received ultimately by the wireless unit 62. In response to the page, the wireless unit 62 my change its state from turned-off to powered-on, or vice-versa.

Figure 6:
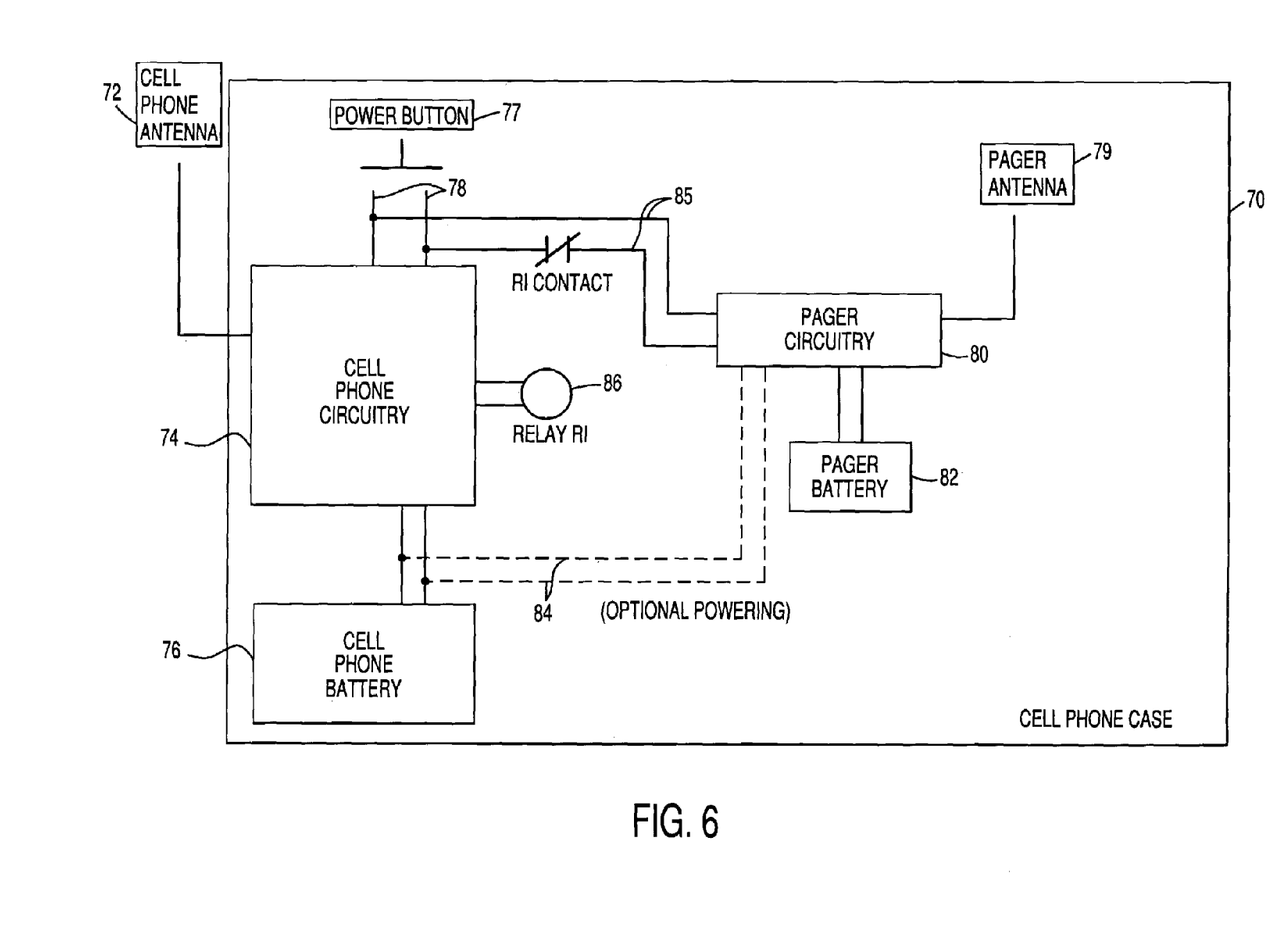
FIG. 6 is a schematic illustrating an exemplary configuration of a wireless unit as may be used with an embodiment of the inventions.

Functions of an Exemplary Wireless Unit—FIG. 6

FIG. 6 illustrates an exemplary wireless unit 70 configured per an exemplary embodiment of the inventions. The wireless unit 70 includes an antenna 72 (also referred to as cell phone antenna) deployed on the exterior of the wireless unit 70. The antenna 72 is connected to circuitry 74 (also referred to as cell phone circuitry), which is connected to a battery 76 (also referred to as cell phone battery). The wireless unit 70 also includes a power button 77 connected by leads 78 to the cell phone circuitry 74. The power button 77 is the conventional on/off button for the wireless unit 70.

The exemplary wireless unit 70 further includes functionality to mimic the power-on/off function of the wireless unit 70 in response to receipt of certain signals. In other words, if the exemplary wireless unit 70 receives certain information, then the wireless unit 70 powers-on or powers-off just as if the conventional on/off button 77 of the wireless unit 70 had been pressed.

In this exemplary embodiment, the power-on/off of the wireless unit 70 is accomplished through a remote power-on function that appears to activate the "conventional" on/off button of the wireless unit 70. The remote power-on function mimics the activation of the on/off button 77. The remote activation is accomplished through the use of certain functions of a digital pager as connected to elements of the wireless unit 70. In particular, the remote power-on function includes a pager antenna 79 connected to pager circuitry 80.

Power to the pager circuitry 80 is provided by a pager battery 82 so that the remote power-on function may operate even when the wireless unit is turned-off. Optionally, the pager circuitry 80 may be connected (as illustrated by dotted lines 84) to the cell phone battery 76 for power. Further, the pager circuitry 80 is connected via connection 85 to the leads 78 that connect the power button 77 to the cell phone circuitry 74. While the wireless unit 70 is turned off, the connection 85 between the pager circuitry 80 and the leads 78 is open (or non-functional). In other words, the connection 85 between the remote power-on/off function does not interfere with the conventional on/off operation of the wireless unit.

In an embodiment, the remote power-on/off function may include a prevention function such as a relay (Relay R1 and also referred to as R1 contact) 86 or other device connected to the cell phone circuitry 74 to prevent the remote powering off of the wireless unit 70 when it is powered-on. In particular, with the R1 contact open, even if another page is received, the open R1 contact prevents the page from affecting the wireless unit 70. In the case where the remote power-off function is desired, the R1 contact is unnecessary.

In this exemplary embodiment, the pager antenna 79 may pass information to the pager circuitry 80 upon receipt of a page as or including a remote power on/off signal. The pager antenna 79 and the pager circuitry 80 may be referred to herein as an exemplary example of a page detector in the wireless unit 70. The page or the remote power on/off signal may include information functioning as a security mechanism to prevent frivolous power-on/off. The security mechanism may be a numeric or other code embedded in the information received as part of the signal from the paging system. Failure of the page or the remote power-on/off signal to include the security mechanism may lead to a failure in turning-on/off of the wireless unit. In response to the detection of the remote power-on/off signal, the pager circuitry takes action to close (or make functional) the connection 85 between the pager circuitry 80 and the leads that connect the power button 77 to the cell phone circuitry 74. As a result of the closing of this connection 85, the activation of the power button 77 is mimicked. In other words, the cell phone circuitry 74 detects information that the wireless unit 70 is to be powered-on (or off), and takes the appropriate action.

The exemplary embodiment described in connection with FIGS. 5 and 6 referred to the use of pager elements and the paging system to remotely power-on/off a wireless unit. The pager elements are described as being included in the wireless unit 70. In an alternate embodiment, the remote power-on/off function may be provided by a unit including the described pager elements where the unit is connectively attached (inside or outside) to the wireless unit 70. Further, instead of a pager, other elements and systems may be used. Such elements and systems may include other data elements and systems such as used with a WiFi network, Bluetooth, or other licensed or unlicensed spectrum suitable for the purpose.

CONCLUSION

From the foregoing description of the exemplary embodiments of the inventions and operation thereof, other embodiments will suggest themselves to those skilled in the art. Therefore, the scope of the inventions is to be limited only by the claims below and equivalents thereof.

We claim:

1. A method to remotely power-on a wireless unit, comprising:
   causing an activation system in a telecommunications system to receive a power-on communication;
   in response to the power-on communication, causing the activation system to send a signal to the wireless unit; and
   causing the wireless unit to power-on in response to the signal,
   wherein causing the wireless unit to power-on in response to the signal comprises causing the wireless unit when the wireless unit is turned-off to be able to receive the power-on signal, and
   wherein causing the wireless unit when it is turned off to be able to receive the power-on signal comprises:
   causing a transmit and receive function of the wireless unit to still be active when the wireless unit is turned-off,
   causing a location function of the wireless unit to still be active when the wireless unit is turned-off, and
   causing a remote power-on function of the wireless unit to still be active when the wireless unit is turned-off.

2. The method of claim 1, wherein causing the wireless unit to power-on in response to the signal comprises:
   causing the wireless unit to include a remote power-on function; and
   causing the remote power-on function to power-on the wireless unit in response to the signal.

3. The method of claim 1, wherein causing the transmit and receive function, the location function, and the remote power-on function of the wireless unit to be active when it is turned-off comprises:
   causing the transmit and receive function, the location function, and the remote power-on function of the wireless unit to be connected to a power source of the wireless unit so that the transmit and receive function, the location function, and the remote power-on function are not affected by an on/off function of the wireless unit.

4. The method of claim 1 further comprising causing a remote power-on function of the wireless unit to deactivate when the wireless unit powers-on.

5. The method of claim 1, further comprising:
causing the activation system to connect a caller, who directed the power-on communication to the activation system, in a communication with the wireless unit after the wireless unit is powered-on.

6. A method to remotely power-on a wireless unit, comprising:
causing an activation system in a telecommunications system to receive a power-on communication;
in response to the power-on communication, causing the activation system to send a signal to the wireless unit; and
causing the wireless unit to power-on in response to the signal,
wherein causing the wireless unit to power-on in response to the signal comprises causing the wireless unit when the wireless unit is turned-off to be able to receive the power-on signal, and
wherein causing the wireless unit when it is turned off to be able to receive the power-on signal comprises:
causing a transmit and receive function of the wireless unit to be active when it is turned-off,
causing a location function of the wireless unit to be active when it is turned-off; causing a remote power-on function of the wireless unit to be active when it is turned-off, and
causing the activation system to provide a confirmation to a sender of the power-on communication.

7. The method of claim 6 wherein causing the activation system to provide a confirmation to the sender comprises causing the activation system to verify that the wireless unit is powered-on.

8. The method of claim 7 wherein causing the activation system to verify that the wireless unit is powered-on comprises causing the activation system to call the wireless unit for a confirmation response.

9. The method of claim 7 wherein causing the activation system to verify that the wireless unit is powered-on comprises causing the activation system to send a message to the wireless unit for a confirmation response.

10. A method to configure a wireless unit that may be remotely powered-on, comprising:
causing the wireless unit to have a power-on state and a sleep state;
causing the wireless unit to go into the sleep state when the wireless unit is turned-off;
causing the wireless unit in the sleep state to have an active transmit and receive function and an active location function; and
causing the wireless unit in the sleep state to change to the power-on state in response to receipt of a remote power-on signal.

11. The method of claim 10, wherein causing the wireless unit in the sleep state to change to the power-on state in response to receipt of the remote power-on signal comprises causing a remote power-on function of the wireless unit to change the state of the wireless unit.

12. The method of claim 10 further comprising causing the wireless unit while in the sleep state not to accept a communication.

13. A method to remotely turn-off a wireless unit that is powered-on, comprising:
causing an activation system in a telecommunications system to receive a turn-off communication;
in response to the turn-off communication, causing the activation system to send a signal to the wireless unit, the signal transmitted to the wireless unit over a communications network;
causing the wireless unit to turn-off in response to the signal; and
causing a remote power-on function of the wireless unit to be active when the wireless unit turns-off,
wherein the remote power-on function includes causing a transmit and receive function of the wireless unit to be active, and
wherein the remote power-on function includes causing a location function of the wireless unit to be active.

14. The method of claim 13, further comprising:
causing the activation system to receive a power-on communication;
in response to the power-on communication, causing the activation system to send a power-on signal to the wireless unit; and
causing the wireless unit to power-on in response to the power-on signal.

15. A wireless communications device comprising:
a power source;
a radio receiver coupled to the power source;
a remote power circuit coupled to the receiver;
a power relay coupled to the remote power circuit and the power source;
additional circuitry coupled to the power relay;
the remote power circuit generating a turn-on signal in response to a signal from the radio receiver, the power relay coupling the additional circuitry to the power source in response to the turn-on signal; and
a wireless communications device location circuit coupled to the power source,
wherein:
the remote power circuit generates a turn-off signal in response to a signal from the radio receiver, the power relay decoupling the additional circuitry from the power source in response to the turn-off signal.

16. The wireless communications device of claim 15 wherein:
the additional circuitry includes a keypad circuit and a display circuit.

17. The wireless communications device of claim 15 further comprising:
a power switch coupled to the power relay, the power switch changing the state of the power relay to provide manual control of power to the additional circuitry.

18. A computer program product for remote power-on of a wireless unit, the computer program product comprising:
a storage medium readable by a processing circuit and storing instructions for execution by the processing circuit for facilitating a method comprising:
causing an activation system in a telecommunications system to receive a power-on communication;
in response to the power-on communication, causing the activation system to send a signal to the wireless unit;
causing the wireless unit to power-on in response to the signal;
causing an activation system in a telecommunications system to receive a turn-off communication;

in response to the turn-off communication, causing the activation system to send a signal to the wireless unit, the signal transmitted to the wireless unit over a communications network; and causing the wireless unit to turn-off in response to the signal.

19. A computer program product for remote power-on of a wireless unit, the computer program product comprising:

a storage medium readable by a processing circuit and storing instructions for execution by the processing circuit for facilitating a method comprising:

causing the wireless unit to have a power-on state and a sleep state;

causing the wireless unit to go into the sleep state when the wireless unit is turned-off;

causing the wireless unit in the sleep state to have an active transmit and receive function and an active location function; and causing the wireless unit in the sleep state to change to the power-on state in response to receipt of a remote power-on signal.

20. The computer program product of claim 19 wherein the storage medium readable by a processing circuit further includes instructions for execution by the processing circuit for facilitating a method comprising:

causing the wireless unit to include a remote power-on function;

causing the remote power-on function to be able to detect receipt by the wireless a remote power-on signal; and in response to detecting the remote power-on signal, causing the remote power-on on to power-on the wireless unit.

* * * * *